United States Patent
Telkka

(10) Patent No.: US 8,447,109 B2
(45) Date of Patent: May 21, 2013

(54) METHOD FOR UTILIZING SEGEMENTATION OF RASTER IMAGE FOR COMPRESSION OF AN IMAGE

(75) Inventor: Tuomo Telkka, Espoo (FI)

(73) Assignee: Anygraaf Oy, Vantaa (FI)

( * ) Notice: Subject to any disclaimer, the term of this patent is extended or adjusted under 35 U.S.C. 154(b) by 120 days.

(21) Appl. No.: 13/202,836

(22) PCT Filed: Feb. 22, 2010

(86) PCT No.: PCT/FI2010/050116
§ 371 (c)(1),
(2), (4) Date: Aug. 23, 2011

(87) PCT Pub. No.: WO2010/094842
PCT Pub. Date: Aug. 26, 2010

(65) Prior Publication Data
US 2011/0299778 A1  Dec. 8, 2011

(30) Foreign Application Priority Data
Feb. 23, 2009  (FI) ..................... 20095175

(51) Int. Cl.
*G06K 9/00* (2006.01)
*G06K 9/34* (2006.01)

(52) U.S. Cl.
USPC ....................................... 382/173

(58) Field of Classification Search
USPC  382/162, 164, 166, 173, 232, 238; 348/231.1
See application file for complete search history.

(56) References Cited

U.S. PATENT DOCUMENTS

| | | | | |
|---|---|---|---|---|
| 5,053,861 A * | 10/1991 | Tsai et al. | ................... | 348/231.6 |
| 5,448,296 A * | 9/1995 | Music | ...................... | 375/240.01 |
| 5,949,968 A | 9/1999 | Gentile | | |
| 6,298,166 B1 * | 10/2001 | Ratnakar et al. | ............... | 382/248 |
| 6,683,979 B1 * | 1/2004 | Walker et al. | .................. | 382/166 |
| 6,735,341 B1 | 5/2004 | Horie et al. | | |
| 7,848,581 B2 * | 12/2010 | Liu | ............................... | 382/232 |
| 2004/0075750 A1 * | 4/2004 | Bateman | .................... | 348/231.1 |

(Continued)

FOREIGN PATENT DOCUMENTS

| | | |
|---|---|---|
| JP | 3820751 | 1/2000 |
| WO | WO9825198 | 6/1998 |
| WO | WO0169937 | 9/2001 |

OTHER PUBLICATIONS

Lieb, "Loading Time," in "Editing for the Web," Towson University (online). Mar. 25, 2007; http://web.archive.org/web/20070325175008/http://pages.towson.edu/lieb/editing/loading.html.

(Continued)

*Primary Examiner* — Amir Alavi
(74) *Attorney, Agent, or Firm* — Alston & Bird LLP

(57) ABSTRACT

The invention relates to a method for the compression of a raster type image material by using segmentation, such that: a widespread start image (1) is divided into segments (1A, 1B, 1C, 1D), such that the segments contain distinct image sections different from each other at least in terms of color qualities thereof, and each segment is compressed with an image compression algorithm chosen according to internal qualities of the segment or with a different set of parameters for the image compression algorithm, coordinates for each segment portion are stored in a memory, and compressed segments (A, B, C, D) and coordinates (XA, XB, XC, XD) therefore are processed for a compression result R.

6 Claims, 2 Drawing Sheets

U.S. PATENT DOCUMENTS

| | | |
|---|---|---|
| 2007/0127771 A1 | 6/2007 | Kaneda et al. |
| 2007/0211937 A1 | 9/2007 | Neumann |
| 2011/0299778 A1* | 12/2011 | Telkka .......................... 382/173 |

OTHER PUBLICATIONS

"Split and Tile Image Splitter," AllGraphicTools.com (online). Jun. 9, 2007; http://web.archive.org/web/20070325175008/http://pages.towson.edu/lieb/editing/loading.html.

"Looking Towards Web," Middlesex University (online). Dec. 20, 2006, p. 19, ll. 20-22; http://liveweb.archive.org/http://www.haringey.gov.uk/lt_workbook_looking_towards_the_web.pdf.

International Search Report dated Aug. 20, 2010, for corresponding Application No. PCT/FI2010/050116.

Written Opinion of the International Searching Authority dated Aug. 20, 2010, for corresponding Application No. PCT/FI2010/050116.

* cited by examiner

METHOD FOR UTILIZING SEGEMENTATION OF RASTER IMAGE FOR COMPRESSION OF AN IMAGE

CROSS REFERENCE TO RELATED APPLICATIONS

This application is a national stage application, filed under 35 U.S.C. §371, of International Application No. PCT/FI2010/050116, filed Feb. 22, 2010, which claims priority to Finnish Patent Application No. 20095175, filed Feb. 23, 2009, both of which are hereby incorporated by reference in their entirety.

BACKGROUND OF THE INVENTION

1. Field of Invention

The invention relates to the compression and presentation of a raster type image, for example a newspaper replica or scanned documents.

2. Description of Related Art

The compression of images is generally performed by using a single algorithm for the compaction of data across the entire image area. A result of this is that an image containing tone, images and text is compressed for example with a JPEG algorithm, which is known for its text smudging effect. On the other hand, algorithms that work well in text compression are poorly applicable to the compression of a photograph.

Segmentation is often used for the reason that, in the process of producing an image, different areas are compressed with different methods, whereby text, for example, is displayed by means of bitmap or vector fonts and a single file can be adapted to contain vector graphics images and images compressed from a bitmap. For example, a document produced by an office or makeup program contains sections compressed in a variety of ways.

Segmentation is also used in the compression of images, such that, within a single image file, a section-by-section movement with respect to the preceding image is identified and the unchanged section is omitted from reproduction. Likewise, parts most important to the human eye, for example a face, can be identified in a section-by-section manner from an image and compressed at a higher accuracy than the rest of the image. This segmentation can be executed within a single MPEG or JPEG file.

BRIEF SUMMARY

It is an objective of the invention to provide an image readable by a standard internet browser and presenting a compression ratio and compression quality better than at present.

A further objective of the invention is to provide a compression mode, which offers a better-than-present user experience in the process of reading typical text- and image-carrying, originally raster type documents by means of a www-browser without having to use any extra programs or elements in the www-browser.

Today, the presentation or compression of documents is generally executed by using Adobe's Flash or PDF technology. An option is to use for example JPEG or GIF type scanned images. The downloading of a PDF document, for example one spread at a time, takes quite a long time and the client is also forced to install a reading program for PDF documents. On the other hand, the image compressed one spread at a time leads generally to a poor compression and results in a bad user experience in the case of a slow internet connection.

According to the invention, the characteristic features of a specific subsection in the image are used for selecting both a display format (1, 2, 4, 8, 16 or 24 bits/pixel) and an employed compression algorithm. Thus, certain sections of the image are presented as palette images, and certain sections by using the coordinates of an entire chosen color space. Moreover, some of the image segments are compressed with a lossy algorithm and some with a lossless one.

Hence, the image is divided into sections, each section is presented in a display format as optimized as possible and compressed with an algorithm best suited for the section. The compressed sections are stored either as individual files or as individual blocks in a single file. This is carried out by making use of prior known open standard formats and algorithms.

The benefits gained by a method of the invention are based on the fact that, in the most general case, the presentation of a single tone image pixel requires a minimum of three 8-bit color coordinates, i.e. a total of 24 bits. For the compression of these, the JPEG algorithm employs e.g. a discrete cosine transform, while the JPEG 2000 algorithm uses wavelets. However, if the image contains more meager-colored sections, a result better in terms of its compression-to-quality relationship will be obtained by displaying the discussed section as a palette image. If, for example, there is a four-color section to be found in the image, the required two bits/pixel already make up as such $1/12$ of the original information; in addition, the obtained palette image is further compressed with a lossless algorithm, which does not smudge text outlines the same way as a JPEG algorithm.

In this patent application is presented a method, wherein, according to what has been described above, the image is segmented with a view of both minimizing the number of colors contained in each image block and, on the other hand, maximizing the size of each image block, such that, in any event, the number of colors contained in a block does not increase over specific limit values. After this, the image blocks are compressed either with a lossless algorithm as long as the number of colors contained in a block is low enough for the image to be displayed in a palette format. In the event that the number of colors in a block is too high for a palette format display, the image will be compressed by using either a JPEG algorithm or a JPEG2000 algorithm. The blocks are stored either individually as specific files or else in a common file, the relative positions of blocks on a chosen set of coordinates being stored as well.

BRIEF DESCRIPTION OF THE FIGURES

In the process of decoding an image, each block is decoded separately and, by making use of coordinate system files stored along with the blocks, said blocks are set in the original positions thereof for creating the original image. The invention will now be described in terms of its operation with reference to the accompanying drawings.

DETAILED DESCRIPTION OF VARIOUS EMBODIMENTS

Figure 1:
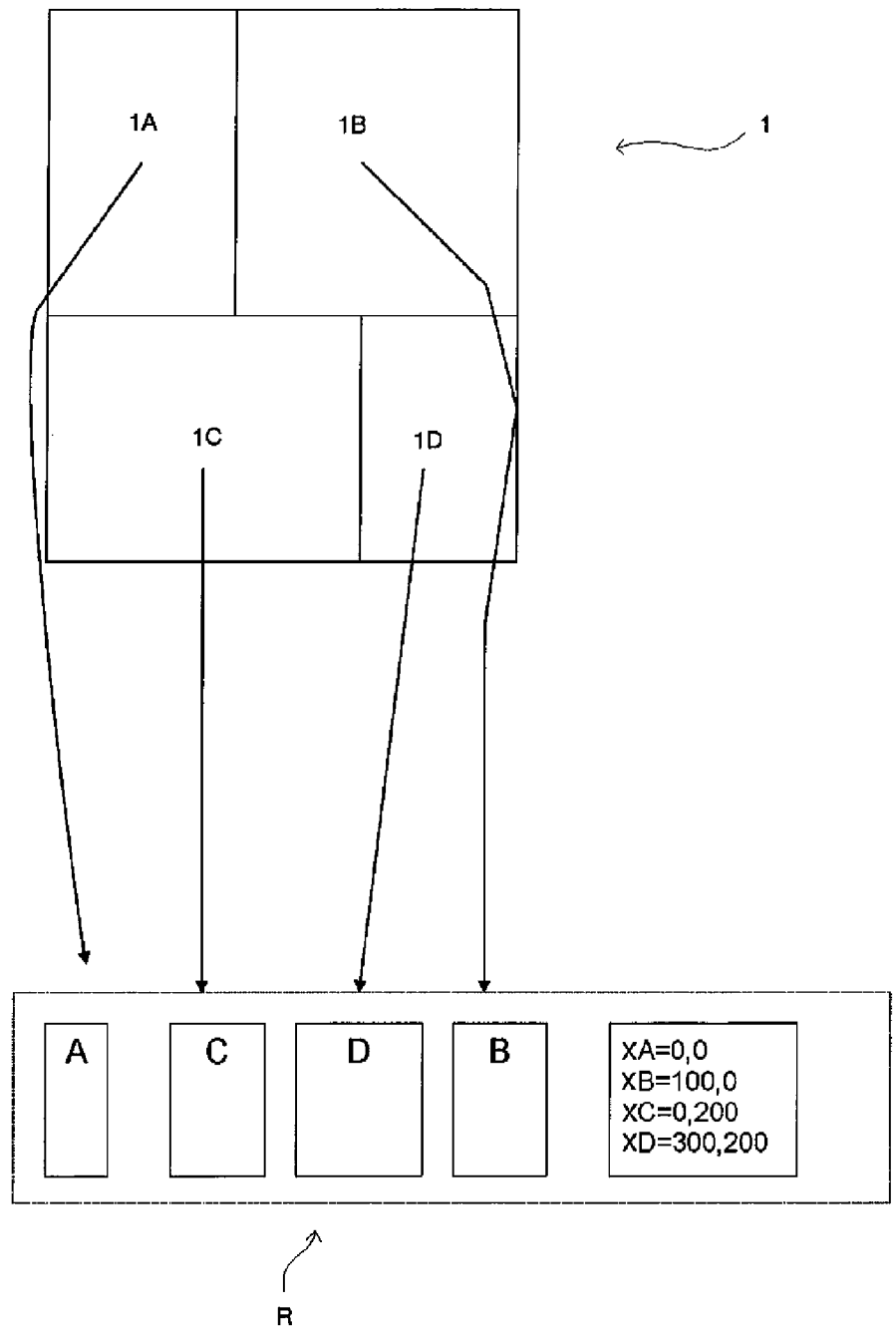
FIG. 1 shows a compression principle of the invention in a schematic view.

In reference to FIG. 1, an image 1 can be divided into four blocks 1A, 1B, 1C and 1D in such a way that the number of colors present in block 1A is four, in block 1B there are 15 colors, in block 1C 200, and in block 1D the number of colors is several thousand.

Now, according to the method, the block 1A is stored in a file or an embedded file A by using a four-color palette, the presentation of one pixel requiring 2 bits, the block 1B is stored by using a 16-color palette (4 bits/pixel, one color left unused), the block 1C by using a 256-color palette (8 bits/pixel), and the block 1D is stored by using a JPEG algorithm. Obtained as a final result are files or embedded files A, B, C and D. Additionally stored is a coordinate in the upper left-hand corner of each block, said coordinates being shown in FIG. 1 with references XA, XB, XC and XD, respectively. Accordingly, the presentation of an image requires the compressed image files A-D and the coordinates XA-XD therefore. Together, these make up a result R. The result R can be presented for example as an HTML code capable of downloading the files A-D for viewing in such a way that the end result matches an original image R.

Figure 2:
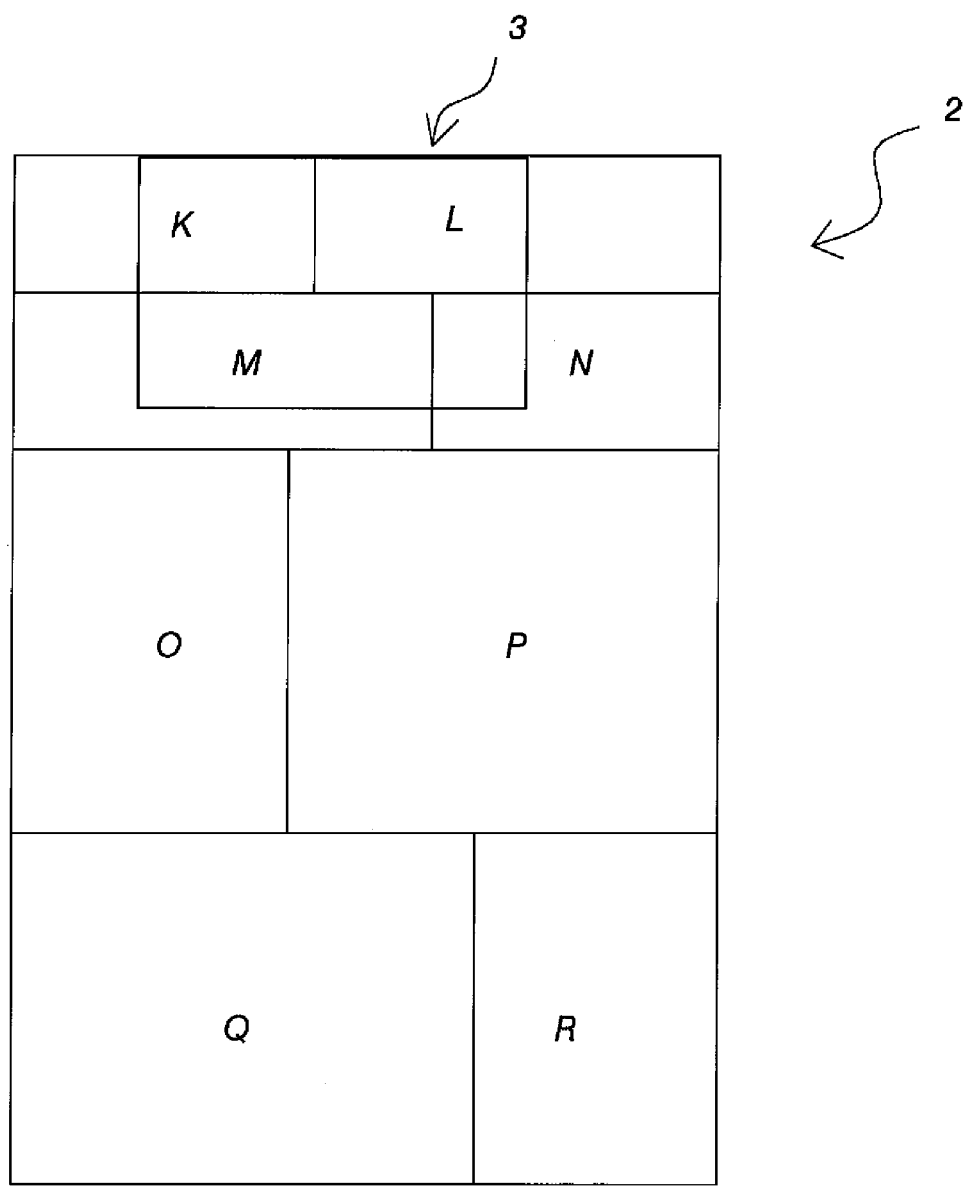
FIG. 2 shows how a data display mode of the invention operates in the context of internet browsing.

FIG. 2 shows how to use a compression of the invention in the process of presenting printed matter in an html form. The entire image to be downloaded is designated with reference 2 and its compressed segments are marked by letters K-R. The user looks at the image by way of a browser window-defined area 3, said browser window area 3 encompassing segments K, L, M and N.

The browser downloads first the image blocks (K, L, M and N) visible in its window. Practically all currently available browsers operate this way. The downloading of blocks left outside the window is not begun by the browser until the downloading of blocks visible in the window is completed. From the user's perspective, the sections left outside the window are downloaded by the browser behind the scenes while the user is reading those visible in the window. This is a remarkable deviation from having to download the entire page area before any part of it can be shown. The downloading of the next page can be on-going behind the scenes by having image blocks of the next page included in zero size at the end of the page. Hence, the next page blocks are also downloaded in a cache by the browser. This enables downloading for example a magazine replica for reading in a higher quality appearance than today and the user's waiting times become shorter. In addition, the user does not need software in his/her browser, but it is sufficient to have a browser which is capable of presenting the employed image formats.

Segments can also be superimposed or partly superimposed. This may be beneficial for example when the background of an image is in the form of a bicolor figure with small images on top of it. Thus, despite its large size, the background image can be compressed into a small volume. Thus, any color contained in the palette anyway can be used in the background image in register with picture elements to be superimposed.

One Option for Implementing a Segmentation Algorithm

Described here by way of example is one simple method for the segmentation of an image.

Let us assume that P is a set of unprocessed start points expressed by coordinates. Added therein at the outset is the upper left-hand corner of an original image. The set of image segments is marked by S. As long as the set P contains points, each element of P is processed as follows:

The point to be processed is expanded to a rectangle A by increasing its breadth and height with a value $\Delta d$. The number of colors contained in A is marked by $C(A)$. Then, iteration is performed by increasing alternately the breadth and height of A with the given $\Delta d$ ($A+\Delta A \rightarrow A'$), yet in such a way that $\Delta A$ does not overstep the original image area $\Delta A$ does not intersect any of the previously processed sections If the area of A is smaller than a given minimum value $a_{min}$, then A=A' shall be inserted If the area of A is larger than a given minimum value $a_{min}$, then the insertion A=A' shall be executed only if the following conditions exist:

A) If $C(A)<=2^n$, then also $C(A')<=2^n$, wherein n is the lowest integer to realize the condition $C(A)<=2^n$ B) If $C(\Delta A)<2^k$, wherein k can be 0, 1, 2

Thus, item 3 impedes the creation of blocks too small.

Item 4 A, in turn, strives to halt the increase of a palette to the powers of two, the employed palette thereby becoming as full as possible.

Item 4 B impedes the expansion of a block richer in colors into a section more meager in colors.

If either 1, 2, 4A or 4B impedes an increase of the height, then the effort is made to increase the breadth and, respectively, vice versa until neither can be increased. Then, A is added to S and the set P is supplemented with the coordinates of a pixel present on the right side of the upper right-hand corner of A as long as said pixel is located within the area of an original image and is not within any of the previously processed segments, and the same is done to the coordinates of a pixel present underneath the lower left-hand corner of A.

Once the set P is vacant, then the set S contains all segments of the original image and the segmentation is complete. This is followed by storing segments, in which the number of colors is <=256, for example in a PNG format, and segments, in which the number of colors is >256, for example in a JPEG format, as well as by storing a list of coordinates for top corners of the segments.

In addition, it is possible to impose a maximum size for the size of blocks or the file size thereof, such that the file size to be transferred at a time in browser operation is always reasonably small. The foregoing way of segmenting is but an example. As an alternative, it is also possible to first retrieve sections abundant in colors, and then to make up the image area with segments less abundant in colors. Furthermore, in addition to the number of colors, the applicable compression algorithm or the parametering criterion for a compression algorithm may be obtained by using for example the vector rendering quality, the face recognition or some other classification of image material. In internet application, a generally beneficial way of rastering text is to make the edges softer by using shades of grey. This represents prior known technology and can be performed prior to or during a compression process of the invention.

Resulting Benefits and Drawbacks

In case the image to be compressed contains a large number of colors in a uniform distribution, the algorithm only produces a single segment, in which the number of colors is thus >256, and no advantage is gained over JPEG or JPEG 2000 algorithms. Perhaps the only advantage here is gained by dissecting a very large-area image for smaller pieces, whereby, from the user's perspective, a currently visible piece of the image becomes downloaded faster and the transfer of entire files into a cache memory proceeds faster.

In the event of compressing material in which a substantial portion of surface area is covered not by tone images but by text or graphics, the method offers considerable benefits. As far as text is concerned, a material is seldom totally black and white and, hence, one-bit palette presentation would be enough. This results from the edge softening of letters, which improves readability. In reality, the number of shades of grey contained in text varies approximately within the range of 4 to 32, whereby the use of a PNG display format offers a more favorable compression ratio than JPG and JPEG2000. A second, at least equally important benefit is improved readability. The sharp tone distinctions in the use of a JPEG algorithm produce a readability- and contrast-deteriorating error on white background. In the presently described method, this particular error does not exist as the compression algorithm itself is lossless, the meager-colored sections after a disassembly process being exactly the same as before the compression process.

A compression process of the invention produces for example image material to be displayed on a www-page and viewable with almost any browser capable of displaying images without requiring any attachments for the presentation of new file formats. The method according to the invention may produce just one output file or a set of image files and coordinates therefore for example in a HTML form or in the form of a table.

The method according to the invention is capable of producing from any raster type source material, for example from a ready-to-print magazine material, a digital magazine suitable for on-line reading and requiring no special programs for the client's computer, not even scripts or cookies. Nonetheless, leafing through a multi-page magazine replica proceeds quickly as long as the compressed images of the following pages, or those linked to a currently viewed page, have been linked to the page being viewed at the moment. Preferably, the HTML code prepared by the method is internally linked, such that for example the entire issue of an on-line magazine is readily transferable to a new address.

Naturally, the image material present on a www-page can be supplemented with other elements or the image material can be embedded in a frame, whereby another frame may contain for example a list of contents along with appropriate links.

The invention claimed is:

1. A method for the compression of a raster type image material by using segmentation, said method comprising the steps of:
dividing a widespread start image material (1) into segments (1A, 1B, 1C, 1D), such that the segments contain distinct image sections different from each other at least in terms of color qualities thereof;
compressing each segment with an image compression algorithm chosen according to internal qualities of the segment, or with a different set of parameters for the image compression algorithm;
storing coordinates for each segment portion in a memory; and
processing compressed segments (A, B, C, D) and coordinates (XA, ZB, XC, XD) therefor for a compression result (R), wherein the result (R) is processed for a www-page imaging code, and the compressed segments (A, B, C, D) cited thereby are discrete compressed image files.

2. A method according to claim 1, wherein a page, which is viewed at a particular time, is further supplemented with a link to the compressed image files (A, B, C, D) of the next page's image material for downloading said files into the browser's cache memory, yet without displaying the same.

3. A method according to claim 1, wherein the size of the segments is defined by minimum and maximum limits, whereof the maximum limit is selected in such a way that the chosen maximum size for a segment is such that an image area, which is set for downloading by a www-browser at one time, is not larger than the order of magnitude of a browser window size in order to reduce the downloading time of a section to be displayed.

4. A method for producing a replica of printed matter in the Internet, wherein the preparation of a page containing the replica is performed by using a method as set forth in claim 1.

5. A method for producing a replica of scanned documents in the Internet, wherein the preparation of a page containing the replica is performed by using a method as set forth in claim 1.

6. A method according to claim 1, wherein the method is performed by using image compression formats supported by WWW-browsers, and the page is assembled by means of the segments' coordinates for a www-page in such a way that the latter is readable with ordinary image-displaying browsers without any separate software.

* * * * *

UNITED STATES PATENT AND TRADEMARK OFFICE
CERTIFICATE OF CORRECTION

PATENT NO. : 8,447,109 B2  
APPLICATION NO. : 13/202836  
DATED : May 21, 2013  
INVENTOR(S) : Telkka Page 1 of 1

It is certified that error appears in the above-identified patent and that said Letters Patent is hereby corrected as shown below:

Title Page, Item (54) and in the Specification, Col. 1, line 1, title reads:

"METHOD FOR UTILIZING

SEGEMENTATION OF RASTER IMAGE FOR

COMPRESSION OF AN IMAGE"

should read:

--METHOD FOR UTILIZING

SEGMENTATION OF RASTER IMAGE FOR

COMPRESSION OF AN IMAGE--

Signed and Sealed this  
Third Day of September, 2013

Teresa Stanek Rea  
*Acting Director of the United States Patent and Trademark Office*